Patented Feb. 23, 1937

2,071,720

UNITED STATES PATENT OFFICE 2,071,720

PURIFICATION OF SILICA SANDS AND THE LIKE

Frederick William Adams, Ealing, England, assignor of one-half to The Rockware Glass Syndicate Limited, London, England, a British company No Drawing. Application September 1, 1934, Serial No. 742,517. In Great Britain September 5, 1933

7 Claims. (Cl. 252—8)

This invention relates to the purification of silica sands and the like and has particular reference to the reduction of the iron content of silica sands so as to render them available for use in the production of white or colorless glass.

The sands used for glass making are mainly composed of silica the content of which is usually well over 90 per cent and in the high class sands more than 99 per cent, the principal impurities present being metallic oxides such as iron oxide and titanium oxide and in addition various other inorganic impurities in small quantities. Difficulties are experienced by the glass manufacturer due to the presence of iron oxide in glass-making sands because of the intense coloring power exerted by this oxide even when present in minute quantities, so that even in the best quality glasses the effect of the iron oxide content, if uncorrected, is to cause a greenish or even a deep green color in the finished glass. In the production of so-called colorless glass some means, such as the addition of another coloring agent to produce a complementary color, has to be employed for masking the green color due to the presence of iron in the glass, but when the sand contains more than about 0.04 per cent iron oxide it is difficult to mask the green color by the use of any of the usual decolorizing agents. Deposits of sand in England and elsewhere which are sufficiently low in iron oxide to be usable for making white (colorless) glass are very limited, so that heretofore for the manufacture of high quality glasses there have been usually employed imported silica sands of particularly high grade, these sands having an iron oxide content of between about 0.01 and 0.03 per cent. There are, however, numerous deposits of silica sand in England and other countries which would be valuable for the manufacture of high quality glass if the iron oxide content of such sands could be eliminated or substantially reduced.

Most sands can be improved by washing with water which removes the silt associated with the sand. Unfortunately, however, this leaves the iron oxide film on the grains of sand unaffected. The film of iron oxide on the grains is very tenacious and it is present to a more or less degree in all deposits due to the infiltration of iron bearing waters through the sand beds.

There have been various methods proposed for the purification of sands, particularly with a view to attacking the film of iron oxide on the sand grains in order to remove it. Amongst such proposals there may be mentioned (a) treatment with strong acids, with or without heat, to purify the sand by the removal of iron oxide, (b) roasting the sand with sodium chloride following by leaching with water, (c) washing the sand with an aqueous solution of sodium carbonate or sodium sulphide, and (d) treating washed quartz sand with a solution containing 15 per cent sulphuric acid and 5 per cent ferrous sulphate at a temperature of between 80° to 100° C. Further for the removal of impurities such as iron and manganese compounds from minerals or rocks such as quartz and feldspar it has been proposed to treat the disintegrated material with a purifying liquid comprising a mixture of fairly strong sulphuric acid with hydrochloric acid and oxalic acid.

The various methods above mentioned have only been applied successfully to particular types of sands and have in general proved to be too costly and/or are open to other objections.

The present invention has for its object to provide a simple and inexpensive method for the purification of ferruginous sands by removing the film or coating of iron oxide on the individual grains of sand so as to render the sand suitable for use in the manufacture of colorless glass. For this purpose according to the present invention the sand is treated with an aqueous solution containing a small quantity of an acid oxalate or quadroxalate and a small amount of crystalline ferrous sulphate not exceeding about one half the quantity of the acid oxalate or quadroxalate, the treatment being effected with a warm solution considerably below the boiling point and preferably at a temperature of between about 80° F. and 150° F. The solution acts rapidly and quickly removes the coating or film of iron oxide from the particles of sand. During the treatment the sand should be well agitated with the solution, and the vessel or container in which the treatment is carried out should be made of or at least have its interior lined with a material that is not acted upon by the solution. After treatment with the solution, for which a period of about 2½ to 5 minutes is usually sufficient, the sand is separated from the solution and then washed with water to remove the chemicals introduced by the solution.

Preferably the acid oxalate used in the solution is sodium hydrogen oxalate, $C_2O_4NaH$, while a suitable quadroxalate that may be employed is potassium quadroxalate, $C_2O_4KH$, $C_2O_4H_2$, $2H_2O$, the preferred composition of the aqueous solution being one containing about .25 to 2 parts of the acid oxalate or quadroxalate and about ⅛ to ½ of that quantity of crystalline ferrous sulphate to 100 parts water, all the parts being by weight.

As an illustration of the efficacy of the new method of treatment according to the invention, it may be mentioned that 100 grammes sand with an original iron content of 0.073 per cent were treated with 100 grammes of an aqueous solution, containing 1 part by weight sodium hydrogen oxalate, 0.25 part by weight crystalline ferrous sulphate, and 100 parts by weight water, at a temperature of about 90° F. for five minutes, and after removing the solution from the sand and well washing it with water the sand was found to contain only 0.02 per cent iron oxide. A second treatment with a fresh solution of the same composition resulted in an additional improvement of the sand the iron content of which was then reduced to 0.017 per cent.

By means of the process according to the present invention, sands which would otherwise be unusable for the manufacture of white or colorless glass on account of their containing too high a proportion of iron oxide can now be purified at a cost which is not prohibitive and thereafter utilized in the glass industry.

Although the invention has been described above as more particularly applied to the treatment or purification of silica sands, it is to be understood that the invention can be applied to the treatment or purification of other substances or minerals, such as china clays, barytes, etc., for the purpose of reducing or removing the iron content which may be present as films or coatings of iron oxide on the particles of the substances. The term "and the like" used in the title, specification and claims is therefore intended to cover substances other than silica sands which can be treated according to the invention for the purpose specified.

What I claim and desire to secure by Letters Patent of the United States is:—

1. A method for the treatment or purification of silica sands which comprises treating the sand with a warm aqueous solution containing a small quantity of an alkali acid oxalate and a small amount of crystalline ferrous sulphate not exceeding one half the quantity of the acid oxalate or quadroxalate.

2. A method as in claim 1, in which the temperature of the said solution is between about 80° F. to 150° F.

3. A method according to claim 1, in which the aqueous solution contains from .25 to 2 parts of the acid oxalate a quantity of ferrous sulphate equal to ⅕ to ½ of the quantity of the acid oxalate in 100 parts of water.

4. A method for the purification of silica sands, which consists in treating the sand with a warm aqueous solution containing a small quantity of an alkali quadroxalate and a small quantity of crystalline ferrous sulphate not exceeding one half the quantity of the acid oxalate or quadroxalate.

5. A method for the treatment or purification of mineral substances containing iron oxide as impurity, which consists in treating the said mineral with an aqueous solution containing both an alkali acid oxalate and ferrous sulphate.

6. A method for the treatment of mineral substances containing iron oxide as impurity, which consists in treating the said mineral with a warm aqueous solution containing a small quantity of potassium quadroxalate and a small quantity of crystalline ferrous sulphate not exceeding one half the quantity of the potassium quadroxalate present.

7. A composition of matter adapted for use in the purification of minerals containing iron oxide as impurity, said composition consisting of an aqueous solution containing both an alkali acid oxalate and ferrous sulphate, in which the quantity of ferrous sulphate is at maximum one half of the acid oxalate.

FREDERICK WILLIAM ADAMS.